(12) United States Patent
Ayers et al.

(10) Patent No.: US 8,534,306 B2
(45) Date of Patent: Sep. 17, 2013

(54) SUBSEA HOT TAP SYSTEMS AND METHODS

(75) Inventors: Ray Rolland Ayers, Houston, TX (US); Michael Hosokawa Dupre, Houston, TX (US); Michael Lee Eckstein, Katy, TX (US); Jack Everett Miller, Houston, TX (US)

(73) Assignee: Shell Oil Company, Houston, TX (US)

( * ) Notice: Subject to any disclaimer, the term of this patent is extended or adjusted under 35 U.S.C. 154(b) by 610 days.

(21) Appl. No.: 12/376,531

(22) PCT Filed: Aug. 6, 2007

(86) PCT No.: PCT/US2007/075281
§ 371 (c)(1),
(2), (4) Date: May 4, 2010

(87) PCT Pub. No.: WO2008/021792
PCT Pub. Date: Feb. 21, 2008

(65) Prior Publication Data
US 2010/0212754 A1    Aug. 26, 2010

Related U.S. Application Data

(60) Provisional application No. 60/821,801, filed on Aug. 8, 2006.

(51) Int. Cl.
*B23B 41/08* (2006.01)
*F16L 41/04* (2006.01)

(52) U.S. Cl.
USPC ........................................ 137/15.14; 137/318

(58) Field of Classification Search
USPC ........... 137/318, 317, 240, 242, 15.12, 15.07, 137/15.01, 15.13, 15.14; 285/96, 106, 197; 251/175; 83/431, 553, 558; 451/38, 51, 451/75, 87
See application file for complete search history.

(56) References Cited

U.S. PATENT DOCUMENTS

| | | | |
|---|---|---|---|
| 4,050,720 A | 9/1977 | Reneau | 285/18 |
| 4,223,925 A | 9/1980 | Reneau et al. | 285/197 |
| 4,538,946 A * | 9/1985 | Bloch | 409/179 |
| 4,743,149 A * | 5/1988 | Geise | 409/179 |
| 6,200,068 B1 * | 3/2001 | Bath et al. | 405/184.1 |
| 6,290,431 B1 * | 9/2001 | Exley et al. | 405/158 |
| 6,290,432 B1 * | 9/2001 | Exley et al. | 405/173 |
| 6,648,562 B1 | 11/2003 | Calkins et al. | 408/67 |
| 6,884,373 B1 * | 4/2005 | Johnson et al. | 264/32 |
| 7,722,298 B2 | 5/2010 | Russell | |
| 2007/0080535 A1 * | 4/2007 | Howard et al. | 285/272 |

FOREIGN PATENT DOCUMENTS

JP    0552289    3/1993

OTHER PUBLICATIONS

International Search Report dated Jan. 2, 2008 (PCT/US2007/075281).

* cited by examiner

*Primary Examiner* — Stephen M Hepperle
*Assistant Examiner* — Kevin E Lynn

(57) ABSTRACT

A subsea hot-tapping system, comprising an existing pipeline; a hot-tap body fitted around the pipeline; and a fluid injected between the pipeline and the body. In some embodiments, the system also includes a radial arm cutter, adapted to cut a hole in the existing pipeline.

18 Claims, 11 Drawing Sheets

SUBSEA HOT TAP SYSTEMS AND METHODS

PRIORITY CLAIM

The present application claims priority of U.S. Provisional Patent Application No. 60/821,801 filed 8 Aug. 2006.

FIELD OF THE INVENTION

The invention relates to subsea hot-tapping systems and methods.

BACKGROUND OF THE INVENTION

Subsea hot tapping involves creating a new branch of an existing pressurized subsea flowline. This is done by locating the position on the existing line where the hole will be created, installing a pressure containment collar, drilling a hole in the line, removing the coupon, and connecting the new line to the old one. Subsea hot tapping has been a very complex and expensive operation, involving bulky and massive apparatus and collars.

U.S. Pat. No. 6,648,562 discloses an apparatus for tapping a hole in a pipeline adapted to be attached to a support assembly having sealed communication with the exterior of a pipeline and having a tapping machine body with a boring bar rotatably supported therein with a circular cutter at the lower end thereof, a feed screw rotatably supported by the tapping machine body for axially positioning the boring bar, a hydraulically powered boring bar drive assembly within the tapping machine body driving the boring bar, a hydraulically powered feed screw drive assembly within the tapping machine body driving the feed screw and an auxiliary drive shaft affixed to rotate the feed screw drive assembly extending exteriorly of the tapping machine body and adapted to receive supplementary mechanical rotary energy for rotation of the feed screw so the boring bar can be retracted if hydraulic power is lost. A pressure compensation system permits the apparatus to be operated in a subsea environment. A position indicating system permits the location of the boring bar to be read out at a remote location, such as on the ocean's surface and an improved coupon retainer is provided. U.S. Pat. No. 6,648,562 is herein incorporated by reference in its entirety.

U.S. Pat. No. 6,290,432 discloses a diverless process of tapping a pressurized subsea pipeline without removing the pipeline from service. The process includes the steps of lowering and landing a measurement tool onto the pipeline in order to check ovality and straightness of the pipeline with the measurement tool. Pipe lift frames are lowered and landed onto the pipeline spaced from a chosen location. The pipeline is lifted by hydraulic actuators or mechanical screws on the lift frames. A hot tap fitting and accompanying orientation frame are lowered and landed on the pipeline between the pipe lift frames. The pipe lift frames are incrementally raised until the pipeline is fully seated in the hot tap fitting and orientation frame. A fitting clamp is secured to the pipeline. A hot tap machine is lowered onto the hot tap fitting and orientation frame. The pipeline is then tapped with the hot tap machine. The pipeline is thereafter lowered by deflating the lift frame bags. U.S. Pat. No. 6,290,432 is herein incorporated by reference in its entirety.

There is a need in the art for improved hot tapping systems and methods.

There is a need in the art for less massive hot tapping systems.

There is a need in the art for less complex hot tapping systems.

There is a need in the art for hot tapping systems with a lower power requirement.

There is a need in the art for hot tapping systems that can be maneuvered and/or operated with an ROV (remotely operated vehicle).

There is a need in the art for less expensive hot tapping systems and methods.

SUMMARY OF THE INVENTION

One aspect of the invention provides a subsea hot-tapping system, comprising an existing pipeline; an inflatable hot-tap body fitted around the pipeline; and a resin injected between the pipeline and the body. In some embodiments, the system also includes a radial arm cutter, adapted to cut a hole in the existing pipeline.

Improvements of the invention include one or more of the following: improved hot tapping systems and methods;
  lighter hot tapping systems;
  less complex hot tapping systems;
  hot tapping systems with a lower power requirement;
  hot tapping systems that can be maneuvered and/or operated with an ROV (remotely operated vehicle); and/or
  less expensive hot tapping systems and methods

DETAILED DESCRIPTION OF THE INVENTION

Figure 1A:
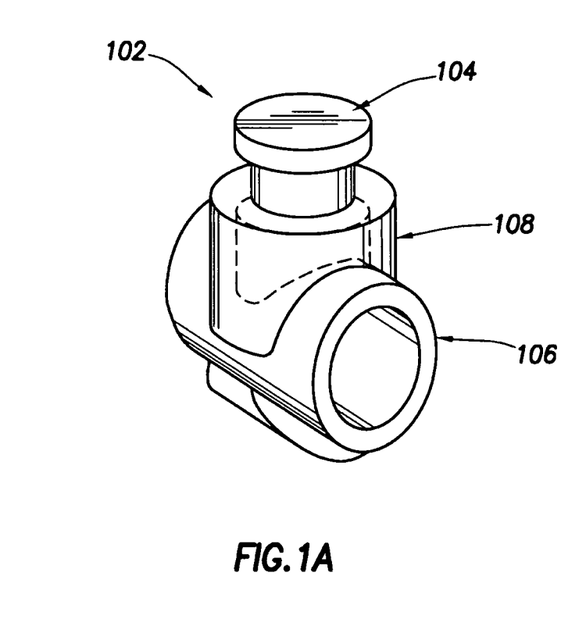
FIGS. 1A-1C illustrate a hot tap in accordance with some embodiments disclosed herein.
Figure 1B:
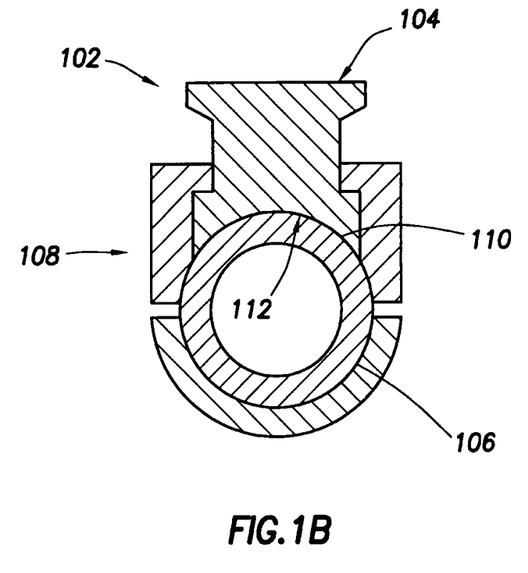
Figure 1C:
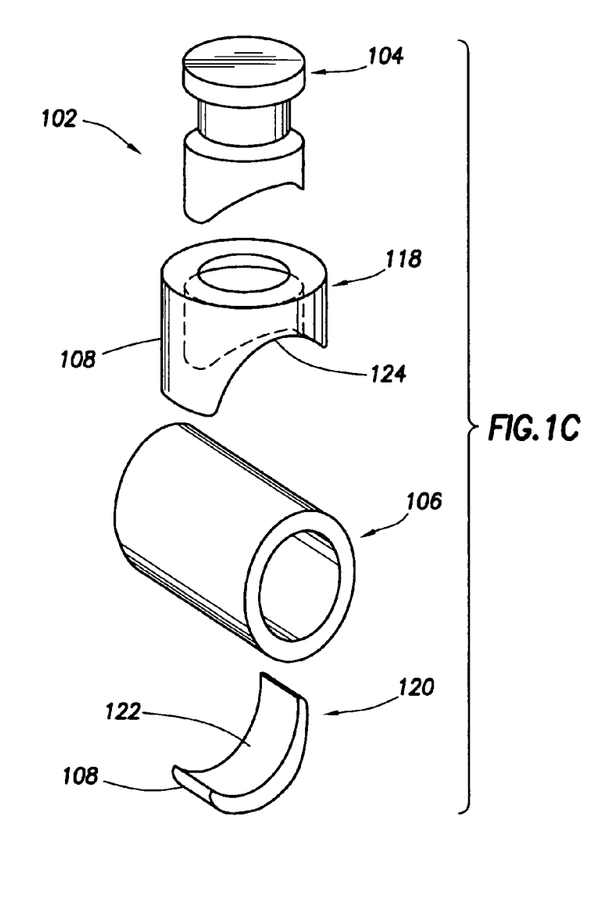

Referring now to FIGS. 1A-1C, there is illustrated an assembled hot tap 102 in accordance with embodiments disclosed herein. As shown in FIG. 1A-1C, a hot tap 102 includes a hot tap fitting 108 coupled to a parent or carrier pipe 106 and a branch pipe 104 disposed in the hot tap fitting 108. As shown in FIG. 1B, branch pipe 104 may include a saddle 110 on a lower surface of branch pipe 104, thereby providing a curved contact surface 112 of branch pipe 104 for engagement with parent pipe 106. In one embodiment, as shown in FIG. 1C, hot tap fitting 108 may include at least two segments, an upper segment 118 and a lower segment 120. One of ordinary skill in the art will appreciate that while segments 118, 120 are referred to as 'upper' and 'lower' segments for ease of understanding the figures, a hot tap fitting may have more than two segments and may be segmented about any axis without departing from the scope of embodiments disclosed herein.

In some embodiments, lower segment 120 of hot tap fitting 108 includes a curved surface 122 configured to engage parent pipe 106. In some embodiments, an inner surface of lower segment 120 may include grips or slips (for example, as shown in more detail below in FIG. 8) for mechanical engagement with parent pipe 106.

In some embodiments, upper segment 118 includes a curved surface 124 configured to engage parent pipe 106. Upper segment 118 is configured to receive branch pipe 104. Upper segment 118 and lower segment 120 of hot tap fitting 108 may be coupled by any method known in the art (e.g., welding, hinges, bolts, screws, rivets, adhesives, etc.) to secure the upper segment 118 to lower segment 120 securely around parent pipe 106.

Figure 2:
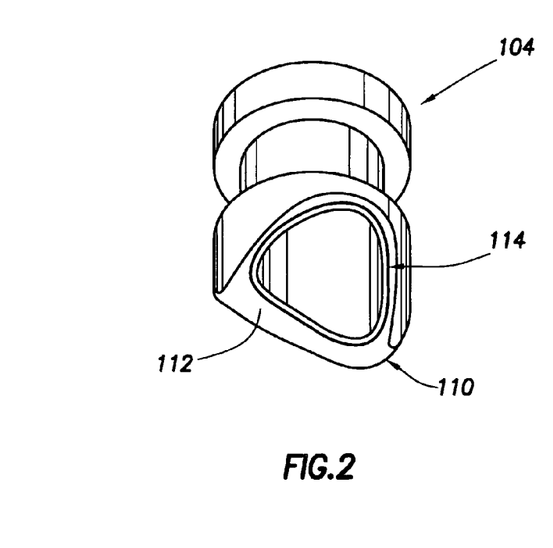
FIG. 2 illustrates a branch pipe in accordance with some embodiments disclosed herein.

FIG. 2 illustrates a detailed view of branch pipe 104. Branch pipe 104 includes a saddle 110 for coupling branch pipe 104 to a parent pipe. At least one sealing element 114 may be disposed on curved contact surface 112 of saddle 110 of branch pipe 104 for sealing engagement between branch pipe 104 and parent pipe 106. Sealing element 114 may be, for example, a "nose" or face seal. For example, sealing element 114 may include an elastomer seal (e.g., flexible o-rings) placed in at least one machined groove in curved contact surface 112 of saddle 110. Accordingly, when hot tap 102 (FIG. 1A) is assembled to parent pipe 106, sealing elements 114 contact and seal branch pipe 106 around parent pipe 106. In another embodiment, at least one sealing element 114 may include dual face seals.

Figure 3A:
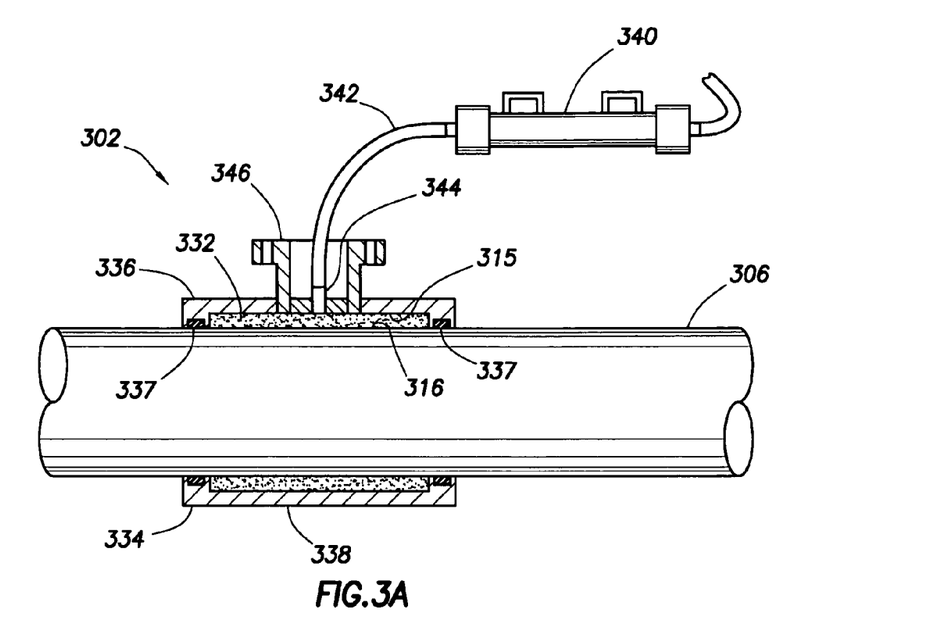
FIGS. 3A and 3B illustrate a hot tap in accordance with some embodiments disclosed herein.
Figure 3B:
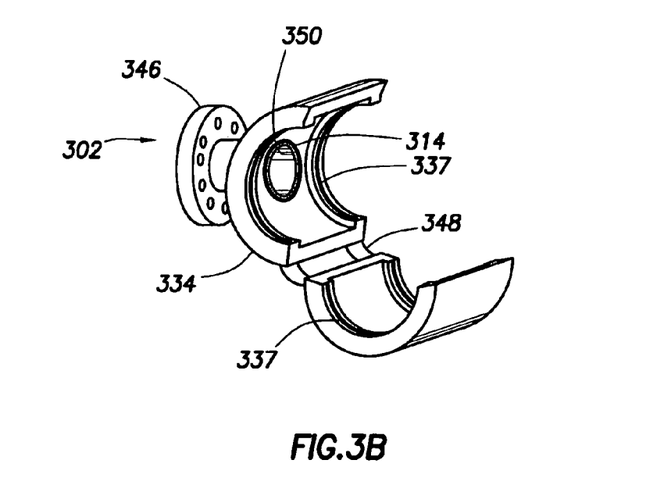

FIG. 3A illustrates hot tap 302 in accordance with some embodiments disclosed herein. In this embodiment, hot tap fitting 334, as shown for example in FIG. 3B, may be assembled around parent pipe 306. Hot tap fitting 334 may include at least two segments, a first segment 336 and a second segment 338, coupled to parent pipe 306. As shown, the first and second segments 336, 338 are coupled by, for example, a hinge 348. In some embodiments, the first and second segments 336, 338 may be coupled by bolts, screws, or other coupling or locking mechanisms known in the art. Sealing elements 337 may be disposed on an inner diameter of hot tap fitting 334 proximate axial ends of the hot tap fitting 334. Sealing elements 337 may be, for example, o-rings or other elastomeric seals known in the art. In some embodiments, branch pipe 346 may be integrally formed with first segment 336, as shown in FIGS. 3A and 3B. Face seals 314 (shown in FIG. 3B) may be disposed around the lower opening 350 of the branch pipe 346. Sealing elements 314 may be, for example, o-rings or other elastomeric seals known in the art.

With reference to FIGS. 3A and 3B, a method of actuating hot tap 302, in accordance with embodiments disclosed herein, is now described. In this embodiment, a resin 332 is introduced between parent pipe 306 and hot tap fitting 334. Examples of resins 332 that may be used in accordance with embodiments disclosed herein, include, epoxies, sealants, or any similar materials known in the art. Resin 332 may be injected or pumped from a resin injector 340 through tubing 342 into a port 344 in hot tap fitting 334. Resin 332 may fill space or voids between an inner surface 315 of hot tap fitting 334 and an outer surface 316 of parent pipe 306. As used herein, this method of injecting resin into the hot tap fitting may be referred to as "inflating" the hot tap or an "inflation" step. Additionally, hot tap 302 may be referred to as an "inflatable hot tap." Resin 332 may provide sealing and setting pressure for sealing the hot tap fitting 334 and parent pipe 306 and, once set, may provide structural rigidity to hot tap fitting 334.

Figure 4:
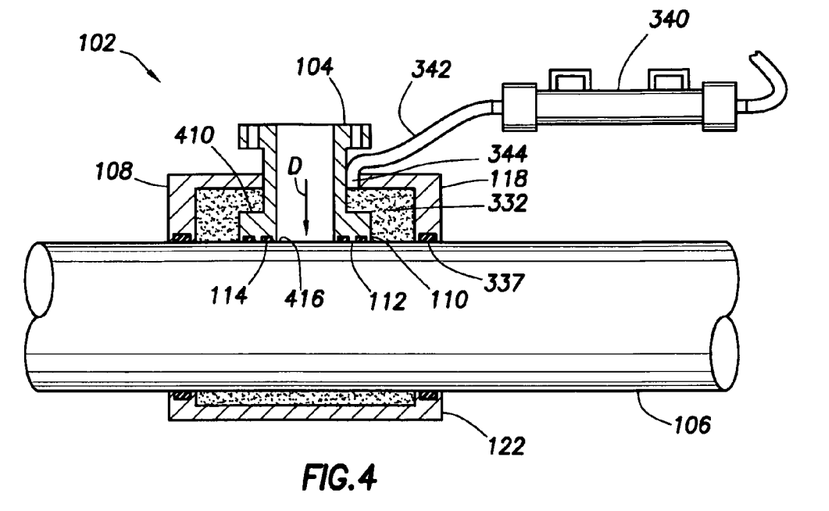
FIG. 4 illustrates a hot tap in accordance with some embodiments disclosed herein.

FIG. 4 illustrates hot tap 102 (with reference to FIGS. 1A-1C), in accordance with some embodiments disclosed herein. In this embodiment, hot tap 102 is assembled around parent pipe 106. Hot tap fitting 108 may include upper segment 118 and lower segment 120. Lower segment 120 and upper segment 118 may be coupled by any method known in the art (e.g., hinges, bolts, screws, etc.). Branch pipe 104 may be assembled with upper segment 108 prior to assembly of hot tap fitting 108 or during assembly of hot tap fitting 108.

With reference to FIG. 4, a method of actuating hot tap 102, including a method of setting branch pipe 104 and energizing sealing element 114, in accordance with embodiments, is now described. In this embodiment, resin 332 may be injected from resin injector 340 through a port 344 disposed between upper segment 118 and branch pipe 104, thereby actuating a "piston" to set sealing elements 114 disposed on curved contact surface 112 of saddle 110. That is, as resin 332 is injected into the hot tap fitting 106, resin 332 acts like a hydraulic fluid acting on piston-like surface 410 of branch pipe 104, thereby moving branch pipe 104 downward (indicated at D) and sealing elements 114 into sealing contact with an outer surface 416 of parent pipe 106. Accordingly, resin 332 provides a sealing and setting pressure to branch pipe 104 to engage and seal branch pipe 104 to parent pipe 106. Once resin 332 is set, sealing engagement of branch pipe 104 and parent pipe 106 may be maintained. Additionally, resin 332 may provide structural rigidity to hot tap 102. Accordingly, a second axial sealing element to seal between upper segment 118 and 120 may not be necessary because sealing engagement between branch pipe 104 and parent pipe 106 may be sufficient to seal a hole tapped into parent pipe 106. Sealing proximate a tapped hole may reduce fitting loads and weight of the hot tap 102. Further, reinforcements needed for a tapped hole may be reduced.

In some embodiments, one suitable resin for subsea use is commercially available from StarMite Systems, Inc., sold as Syntho-Subsea Epoxy.

Figure 5:
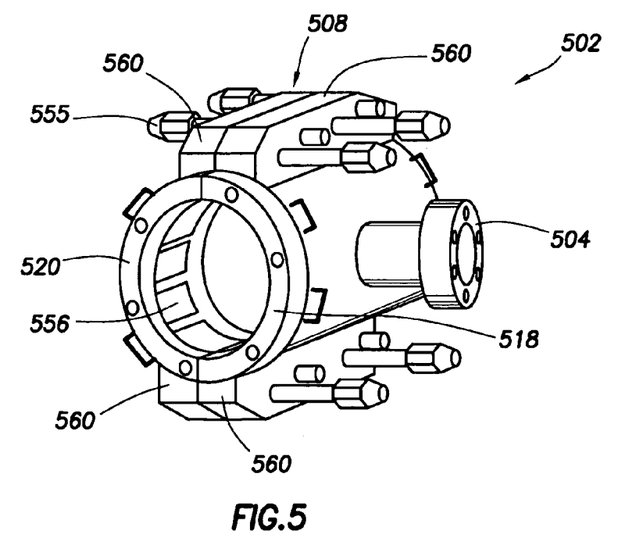
FIG. 5 illustrates a hot tap in accordance with some embodiments disclosed herein.

FIG. 5 illustrates another hot tap 502 in accordance with some embodiments disclosed herein. In some embodiments, hot tap 502 may be designed using an engineering analysis method, for example a finite element analysis (FEA) method, known in the art to provide a minimum weight metal hot tap fitting 508 within the limits of ASME pressure Vessel Code. With the use of these methods, the materials and/or specific shape, size, material, and structure of the hot tap and/or the hot tap fitting may be analyzed to determine a minimum weight hot tap or a hot tap with optimized characteristics and performance. In some embodiments, hot tap 502 includes a hot tap fitting 508 having a first segment 518 and a second segment 520. First and second segments 518, 520 are assembled around a parent pipe (not shown). Grips or slips 556 may be disposed on an inside surface of first and/or second segments 518, 520 to engage hot tap fitting 508 with parent pipe (not shown). A branch pipe 504 is coupled to first segment 518. Branch pipe 504 may be coupled to first segment 518 by any method known in the art, for example, by bolting, welding, or integrally formed with first segment 518. In one embodiment, first and second segments 518, 520 may include mating flanges 560. Studs 555 may be inserted through mating flanges 560 to secure second segment 520 to first segment 518. Studs 555 may be inserted and/or tightened by a ROV. In order to maintain a light-weight hot tap fitting 508, components of hot tap fitting 508 may be formed of, for example, metals; composites; other low-weight, highstrength metals or materials; carbon fiber composites; or other materials as determined through analysis.

In some embodiments, an outer surface of a parent pipe in a location for placement of a hot tap may be cleaned prior to connecting a hot tap to the parent pipe. For example, coatings, rust, debris, etc. may be removed from an outer surface of the parent pipe to prepare the parent pipe for assembly of a hot tap. Additionally, an outer surface of parent pipe may be roughened to provide a better adhesive surface for application of a resin. In some embodiments, shallow circumferential grooves may be formed around a parent pipe to provide an adhesive surface for application of a resin.

Figure 6A:
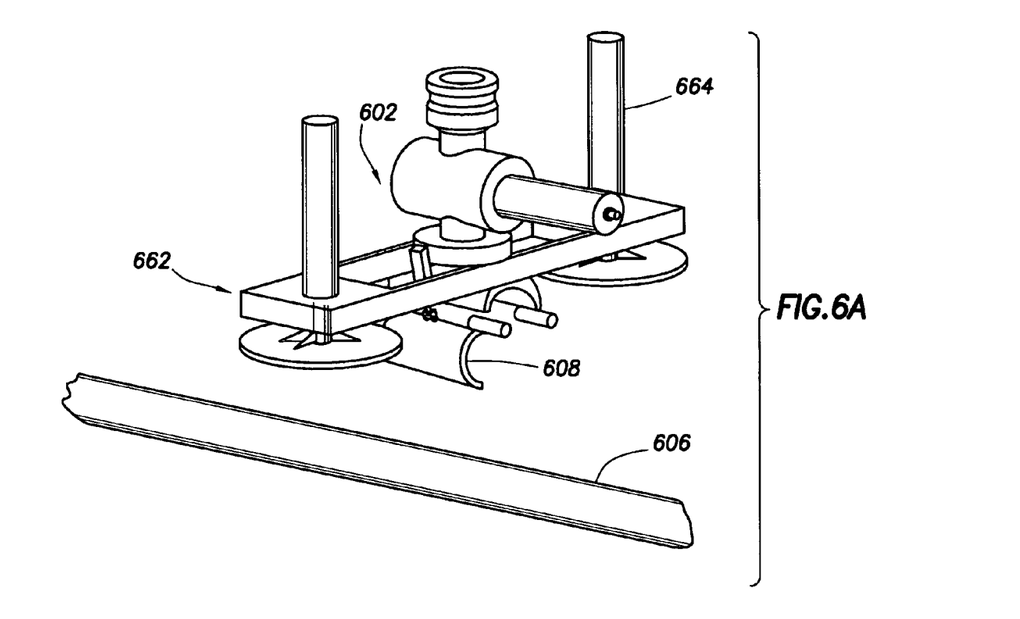
FIGS. 6A and 6B illustrate a hot tap and a frame in accordance with some embodiments disclosed herein.
Figure 6B:
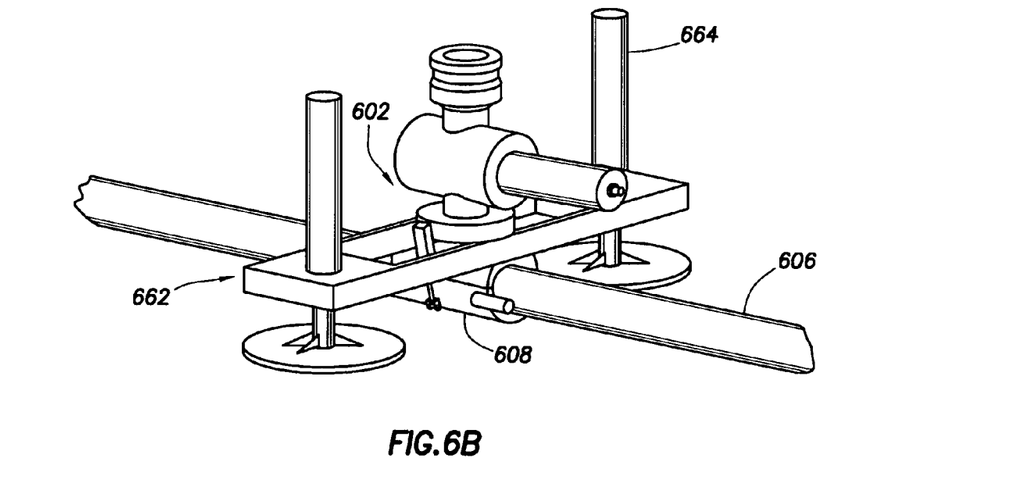

Referring now to FIGS. 6A and 6B, in some embodiments, frame 662 may be coupled to hot tap 602 to provide alignment and positioning of hot tap fitting 608 as it is installed onto parent pipe 606. FIG. 6A shows hot tap 602 as it approaches parent pipe 606, and FIG. 6B illustrates hot tap 602 after it is coupled to parent pipe 606. Frame 662 may be used to control position and alignment of hot tap 602 so as to prevent damage to parent pipe 606 as hot tap 602 is lowered onto parent pipe 606. Further, frame 662 may be provided with outriggers 664, that, when lowered onto the seabed, as shown in FIG. 6B, may stabilize movement of hot tap 602 during installation, minimize rotation of hot tap fitting 608, and/or stabilize any jumper loads. Once hot tap fitting 608 is installed on parent pipe 606, frame 662 may be removed and returned to the surface.

Figure 7:
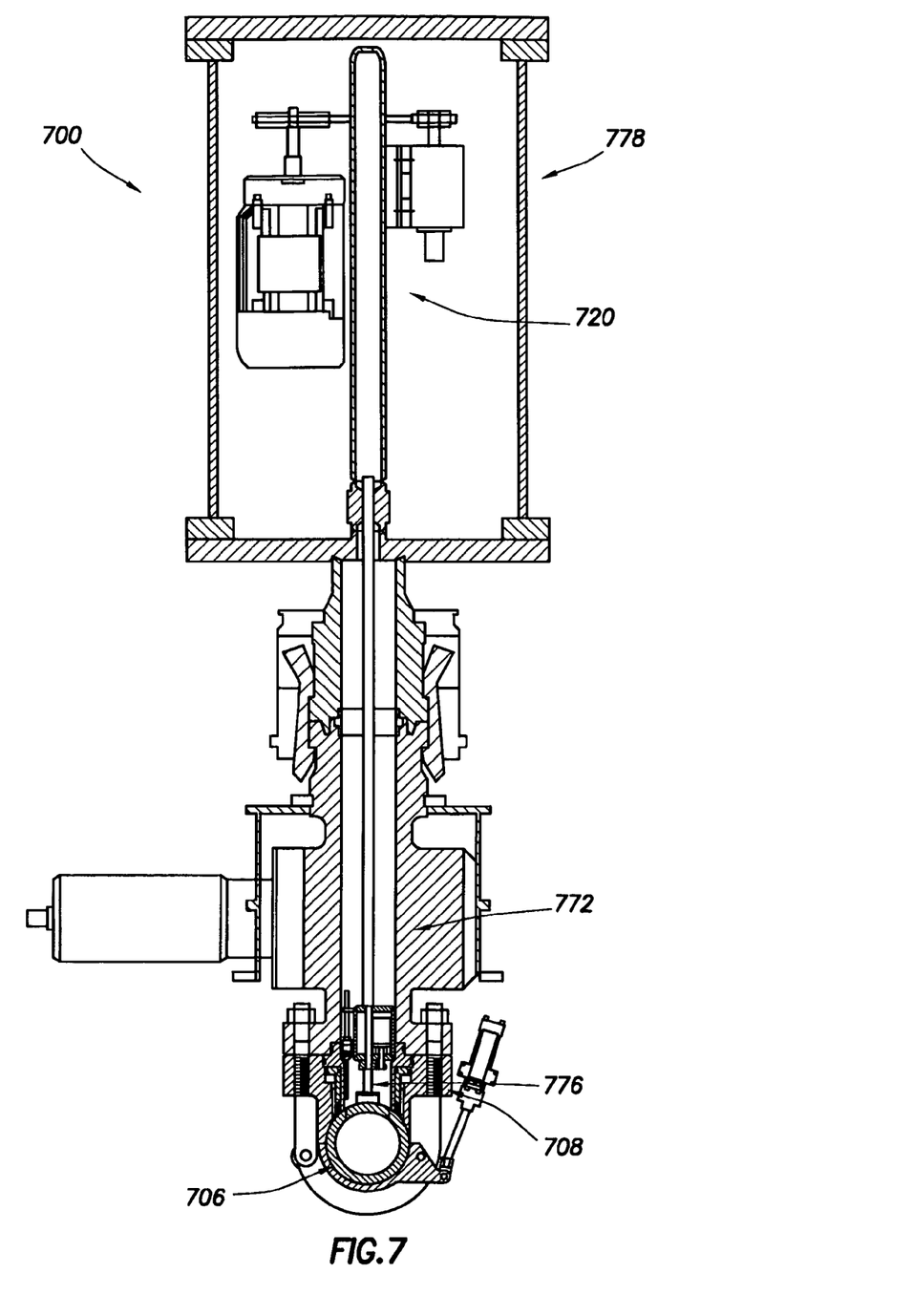
FIG. 7 illustrates a hot tap assembly in accordance with some embodiments disclosed herein.

Referring now to FIG. 7, in accordance with some embodiments, hot tap assembly 700 may include hot tap fitting 708, branch pipe (not shown), valve 772, and cutting system 720. Valve 772 may be, for example, a ball valve or a block valve. Hot tap assembly 700 may be deployed to a pre-determined location on a parent pipe 706 for installation. The hot tap fitting 708 may then be actuated to lock the hot tap fitting 708 into the pre-determined location on parent pipe 706. Once hot tap fitting 708 is actuated or fitted to parent pipe 706 and seals (not shown) disposed within hot tap fitting 708 are set and pre-loaded, a complete pressure test of hot tap fitting 708 may be performed to confirm seal integrity. Once this step is completed, subsea cutting system 720 may proceed to cut a coupon from parent pipe 706 to tie-in branch pipe (not shown) to parent pipe 706. Cutting system 720 may be housed inside pressure containment vessel 778. Valve 772 may be opened to allow cutting tool 776 to move proximate to or contact parent pipe 706. In some embodiments, this process of cutting a coupon out of parent pipe 706 may be performed during live pipeline operations.

Figure 8:
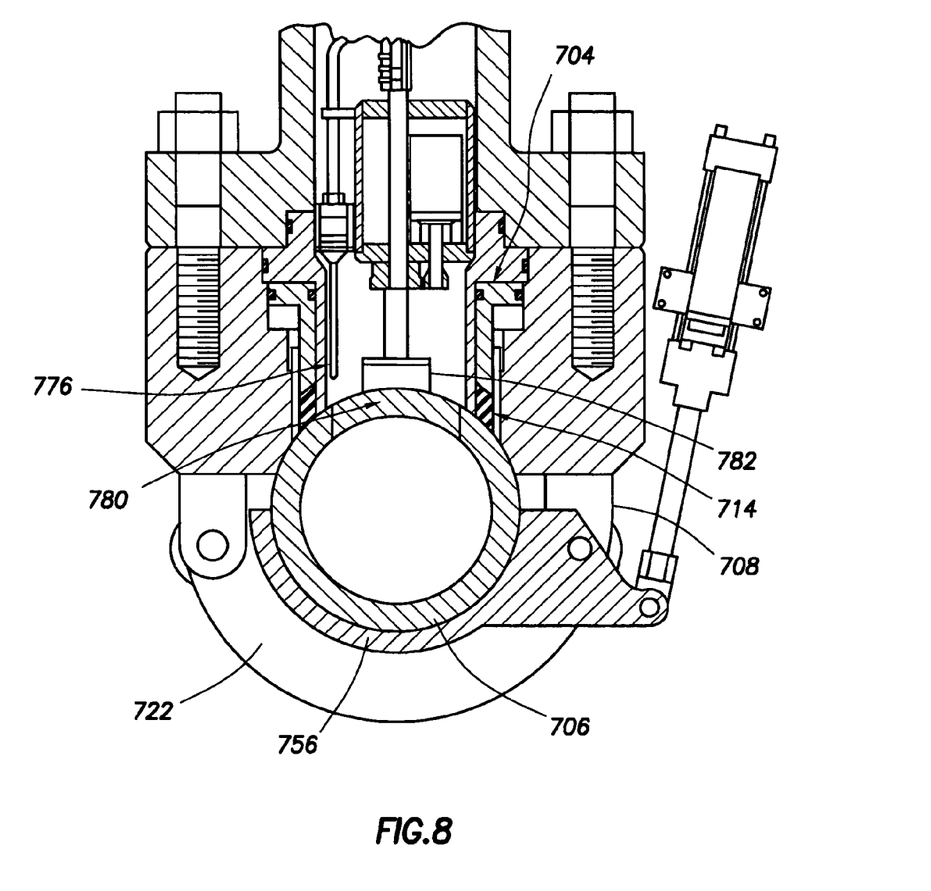
FIG. 8 illustrates a hot tap and cutting system in accordance with some embodiments disclosed herein.

FIG. 8 illustrates a more detailed view of a lower end of hot tap assembly 700, in accordance with some embodiments. Hot tap fitting 708 is shown fitted around parent pipe 706. Grips or slips 756 formed on a lower segment 722 of hot tap fitting 708 engage an outer surface of parent pipe 706. Face seals 714 provide sealing engagement between branch pipe 704 and parent pipe 706. Cutting tool 776 is disposed inside branch pipe 704 at a predetermined radius for cutting a circumference of a coupon 780. A coupon retrieval mechanism 782 is disposed within branch pipe 704, and contacts an outer surface of parent pipe 706. Coupon retrieval mechanism 782 may be any mechanism known in the art for removing cut coupon 780, for example, adhesion or magnetism.

Figure 9:
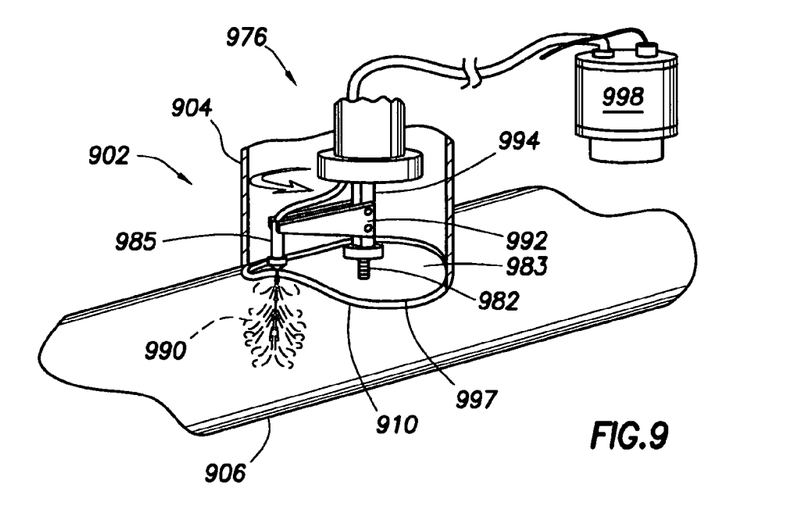
FIG. 9 illustrates a cutting system in accordance with some embodiments disclosed herein.

FIG. 9 illustrates a cutting tool 976 in accordance with some embodiments disclosed herein. As shown, cutting tool 976 is lowered down inside a hot tap 902 fitted to a parent pipe 906. In one embodiment, cutting tool 976 may be lowered inside a branch pipe 904 coupled to hot tap 902. A lower end of branch pipe 904 may include a saddle 910 having a curved contact surface (shown in FIGS. 1A-1C). In this embodiment, face seals (not shown) may be disposed on curved contact surface of saddle 910 and contact an outer surface of parent pipe 906. After setting hot tap 902, branch pipe 904 is in sealing engagement with parent pipe 906.

As shown in FIG. 9, cutting tool 976 includes a water jet 990 for cutting parent pipe 906. Radial arm 992 is coupled to a spindle 994 on a lower end of cutting tool 976. A cutting head 985 is disposed at an end of radial arm 992 opposite the coupling between radial arm 992 and spindle 994. Accordingly, as power is supplied from, for example, an electric power control 998, and water is flowed to cutting head 985, radial arm 992 rotates around spindle 994, thereby moving water jet along a circumference of a coupon 983 to be cut, as marked by cutline 997. One of ordinary skill in the art will appreciate that the radius or size of coupon 983 may be varied by, for example, varying the length of radial arm 992. A coupon retrieval mechanism 982 may be disposed on a lower end of spindle 994 for retaining and removing coupon 983 after the circumference of coupon 983 has been cut.

A water jet is a machining tool that uses a high-pressure water beam to cut through a material. Water used in a water jet for cutting through a material may also include an abrasive element to assist cutting. Abrasive elements may include, for example, sand or polymers. A water jet with an abrasive element may be called an abrasive water jet, although commonly, the terms "water jet" and "abrasive water jet" are used interchangeably. Water jets without abrasive elements may be used to cut soft materials, for example, soft rubber, foam, tin foil, carpet, and soft gasket material. Water jets with abrasive elements may be used to cut harder materials, for example titanium, aluminum, stone, hard rubber, Inconel® (Huntington Alloys Corporation, Huntington, W. Va.), and hardened tool steel. In some embodiments, water may be pumped to cutting head 985 by a subsea pump (not shown) that pressurizes filtered seawater and includes a mixing system to entrain abrasive elements in pump discharge flow. Alternatively, abrasive elements may be mixed with seawater before passing through a pump. In this embodiment, the pump must be robust enough to withstand an abrasive slurry. Water jet systems provide minimum heat generation and minimize effects to material properties of the material being cut. Programmable systems allow accurate shapes to be cut with a water jet with small tolerances (approximately ±0.02 inches).

In some embodiments, one suitable water jet cutting tool for subsea use is commercially available from Norse Cutting & Abandonment, sold as the Abrasive Waterjet Cutting (AWJC) system.

Figure 10:
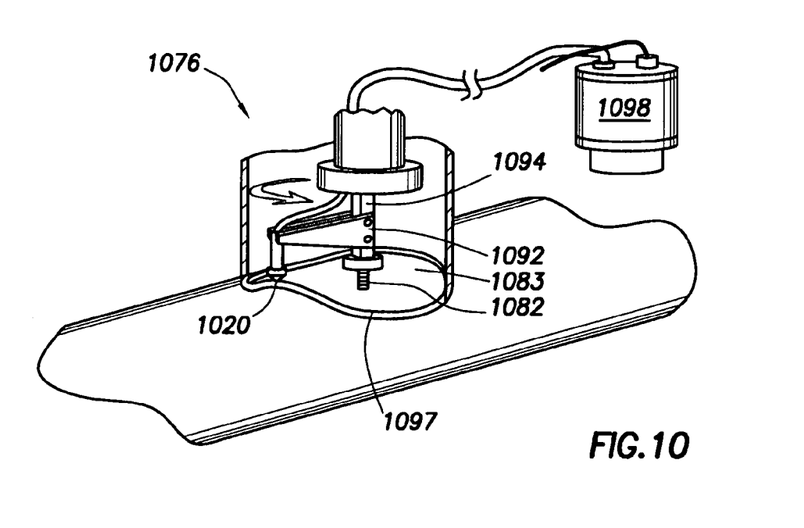
FIG. 10 illustrates a cutting system in accordance with some embodiments disclosed herein.

Referring now to FIG. 10, a cutting tool 1076 including a small diameter milling head 1020 in accordance with embodiments disclosed herein is shown. As shown, milling head 1020 may include carbide tipped teeth or braised tungsten carbide pieces disposed on a lower end to provide a sharp cutting edge. Similar to the tool shown in FIG. 9, a radial arm 1092 may be coupled to a spindle 1094 on a lower end of cutting tool 1076. Milling head 1020 may be disposed at an end of radial arm 1092 opposite the coupling between radial arm 1092 and spindle 1094. As power is supplied from, for example an electric power control 1098, radial arm 1092 rotates around spindle 1094, thereby moving milling head 1020 along a circumference of a coupon 1083 to be cut, as marked by cutline 1097. One of ordinary skill in the art will appreciate that the radius or size of coupon 1083 may be varied by, for example, varying the length of radial arm 1092. A coupon retrieval mechanism 1082 may be disposed on a lower end of spindle 1094 for retaining and removing coupon 1083 after the circumference of coupon 1083 has been cut.

Figure 11:
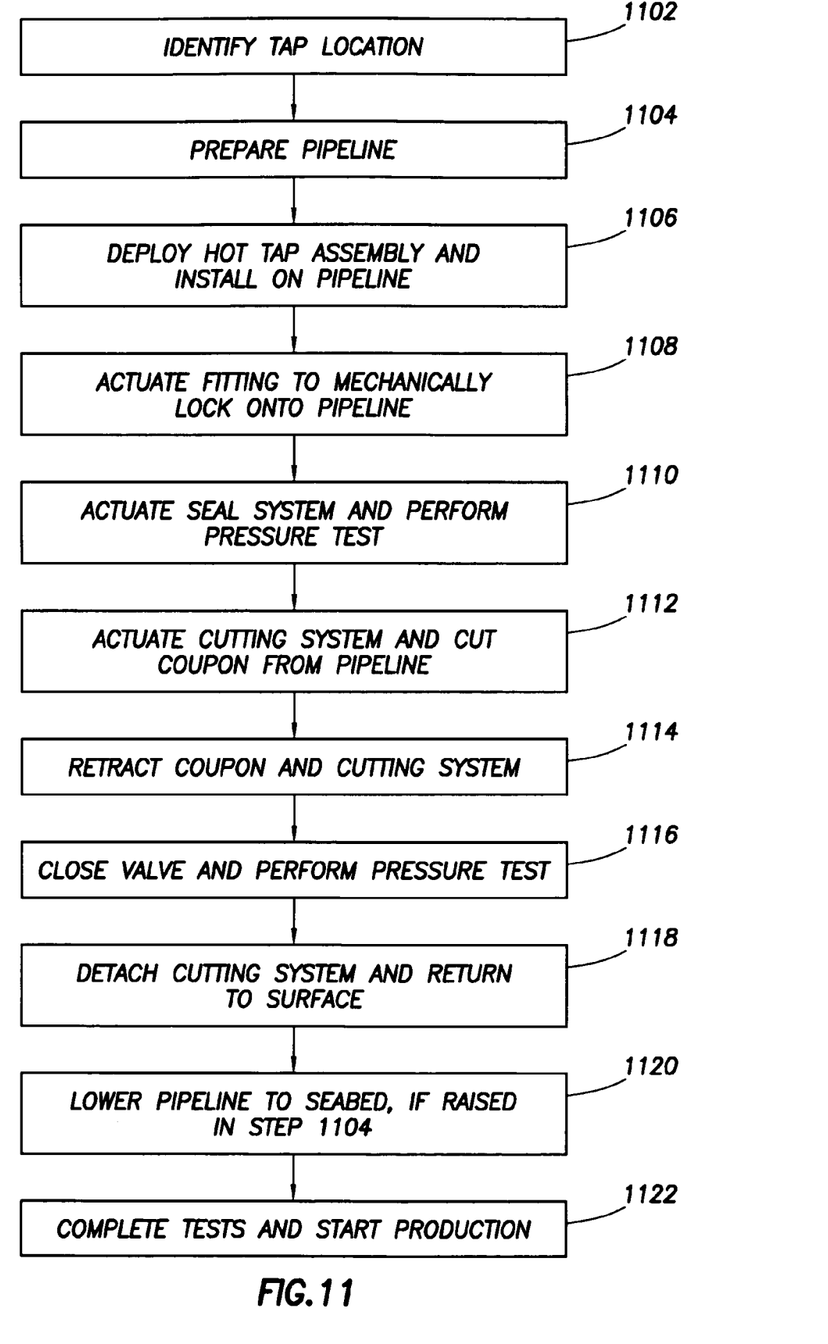
FIG. 11 is a flow diagram of a method of installing a hot tap in accordance with some embodiments disclosed herein.

Referring now to FIG. 11, in some embodiments, a method is disclosed herein for installing a deepwater hot tap. First, a location for a hot tap along an existing pipeline is identified 1102. The pipeline may be prepared 1104 for installment of the hot tap. Preparation of the pipeline may include raising the pipeline above the seabed to allow access to the pipeline or alternatively, excavating a hole around the pipeline to allow access. The process for allowing access to the pipeline may be limited by formation properties and conditions. Preparation of the pipeline may further include removing coatings, debris, or other material from the outside surface of the pipeline in the location where the hot tap is to be installed. Further, the diameter and ovality of the pipeline are measured in the location where the hot tap is to be installed, to ensure a tight fit between the hot tap fitting and the pipeline. Next, the hot tap assembly is deployed 1106 and installed in the pre-determined location on the pipeline. The hot tap fitting is actuated 1108 to mechanically lock it into place on the pipeline. Next, a seal system is actuated 1110 to seal and provide a seal pre-load on the hot tap fitting locked on the pipeline. A pressure test is performed to confirm the seal integrity between the hot tap fitting and the pipeline. Next a cutting system is actuated 1112 to cut a coupon from the pipeline. The coupon and the cutting system are then retracted 1114 through a valve in the hot tap assembly. The valve is then closed and another pressure test is performed 1116 to confirm the integrity of the seals of the hot tap fitting. The cutting system may be detached from the valve and returned to the surface 1118. Next, the pipeline may be lowered back to the seabed 1120 if it was raised during preparation of the pipeline 1104. Metrology between the hot tap fitting, the pipeline, and other components of the hot tap assembly may be completed and verified. Jumper connections may be fabricated and installed based on metrology measurements. Another pressure test may be performed to confirm integrity of the system. Finally, production may be started 1122.

Figure 12:
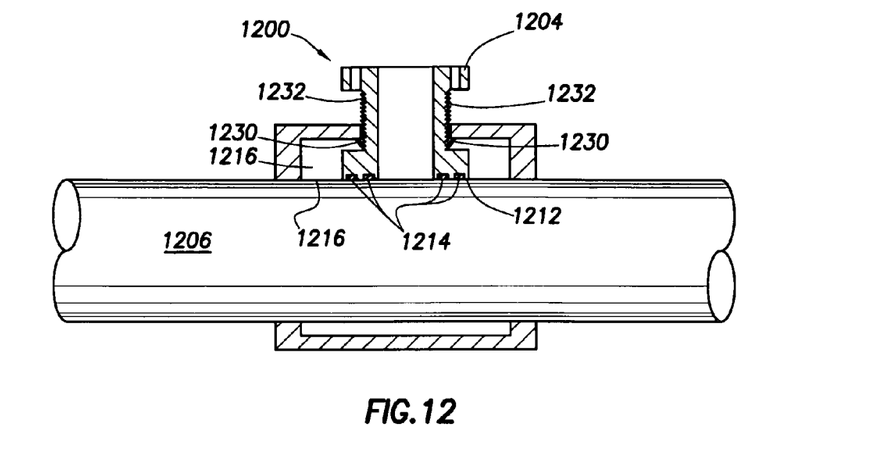
FIG. 12 illustrates a hot tap system.

Referring now to FIG. 12, in some embodiments, a system and method of actuating hot tap system 1200, including a method of setting branch pipe 1204 and energizing sealing elements 1214, is now described. A fluid may be injected into cavity 1216 through a port, thereby actuating a "piston" to set sealing elements 1214 disposed on curved contact surface 1212. That is, as the fluid is injected into cavity 1216, the fluid acts like a hydraulic fluid acting on piston-like surface 1210 of branch pipe 1204, thereby moving branch pipe 1204 downward (indicated by arrow) and sealing elements 1214 into sealing contact with an outer surface 1226 of parent pipe 1206. Accordingly, the fluid provides a sealing pressure to branch pipe 1204 to engage and seal branch pipe 1204 to parent pipe 1206. Sealing engagement of branch pipe 1204 and parent pipe 1206 may be maintained by ratchet arms 1230 engaging teeth 1232 to prevent branch pipe 1204 from moving opposite the direction of the arrow if the fluid pressure drops.

Figure 13:
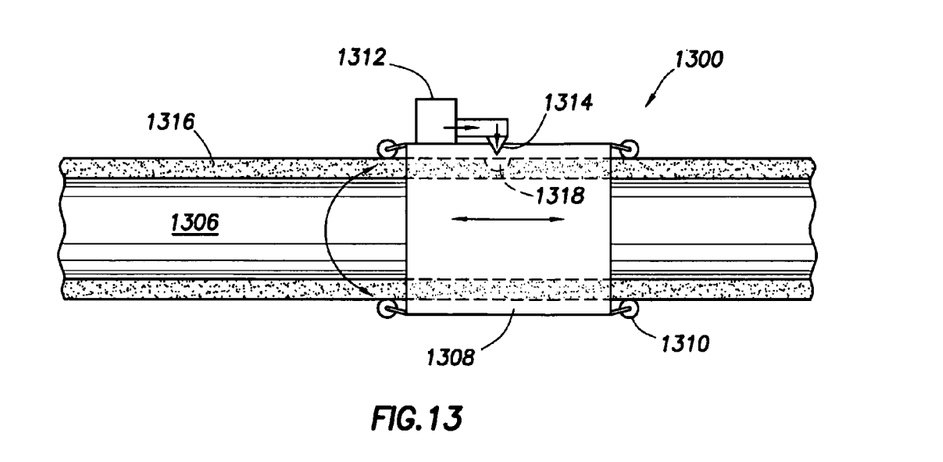
FIG. 13 illustrates a system for cleaning a parent pipe.

Referring now to FIG. 13, in some embodiments, system 1300 for cleaning parent pipe 1306 is illustrated. Pipe 1316 may have a coating, insulation, marine growth, rust, and/or other buildup 1316. Cleaning rig 1308 may be attached to pipe 1306, for example with an ROV. Rig 1308 has wheels 1310 which allow for longitudinal movement along pipe 1308 and circumferential movement about pipe 1308, as shown by arrows. Rig has a high pressure fluid source 1312, for example a pump, and a nozzle 1314 to direct the high pressure fluid against buildup 1316. High pressure fluid acts to erode a hole 1318 in buildup 1316, but the fluid is formulated so that it will not significantly erode pipe 1306.

Figure 14A:
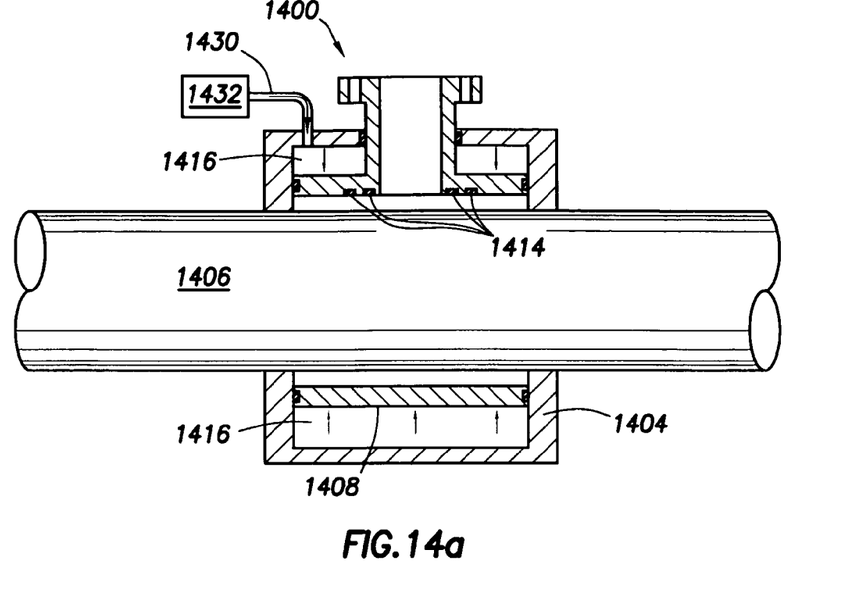
FIGS. 14a and 14b illustrate a hot tap system.
Figure 14B:
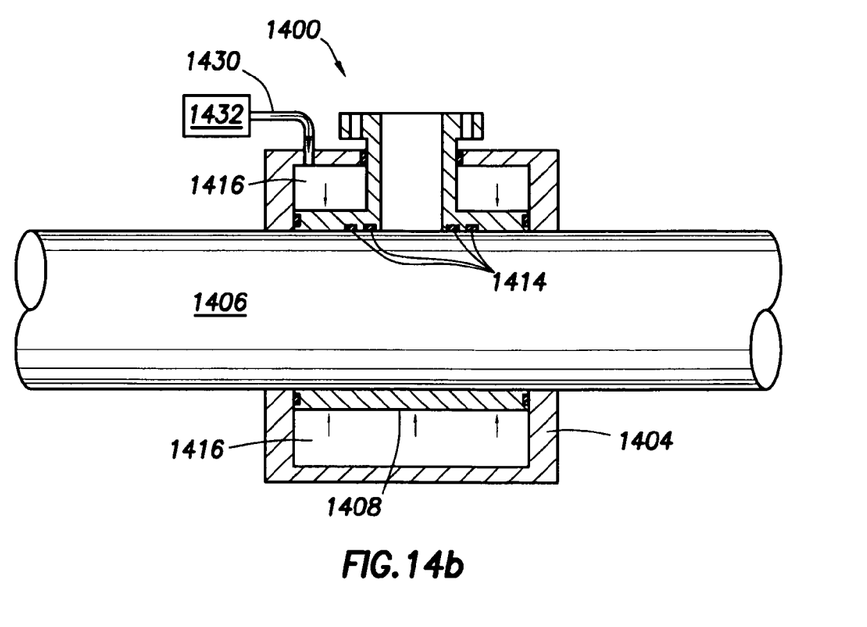

Referring now to FIGS. 14a and 14b, in some embodiments, a system and method of actuating hot tap system 1400, including a method of energizing sealing elements 1414, is now described. System 1400 includes hot tap body 1404 around existing pipe 1406. Hot tap body 1404 includes deformable portion 1408, which defines cavity 1416. A fluid may be injected into cavity 1416 through conduit 1430 from fluid source 1432, thereby deforming membrane 1408 to force sealing elements 1414 against pipe 1406, as shown in FIG. 14b. Accordingly, the fluid provides a sealing pressure to engage seal 1414 against parent pipe 1406. Sealing engagement of branch pipe 1404 and parent pipe 1406 may be maintained by ratchet arms 1430 engaging teeth 1432 to prevent branch pipe 1404 from moving opposite the direction of the arrow if the fluid pressure drops.

In some embodiments, membrane 1408 comprises an elastomer. In some embodiments, membrane 1408 comprises a metal, for example steel or aluminum.

In some embodiments disclosed herein, a hot tap capable of connecting to flowlines with pressures of approximately 10,000 psi and in approximately 10,000 fsw (feet of seawater) is provided. Further, hot taps disclosed herein may be used in diverless environments. For example, hot taps in accordance with embodiments disclosed herein may be installed and actuated by a ROV.

In some embodiments described herein, there is provided a hot tap system that that is lighter and easier to install on a parent pipe. Additionally, embodiments described herein may provide a hot tap assembly, including hot tap fittings and a cutting system, that is more cost effective, more efficient, and easier to use. Further, embodiments described herein may provide a hot tap assembly that may be installed and operated by a ROV.

In some embodiments, the parent pipe has a diameter from about 1.5 to about 10 times larger than the branch pipe diameter, for example from about 2 to about 5 times larger.

In some embodiments, the parent pipe has a diameter from about 4 to about 10 times larger than the parent pipe's thickness, for example from about 6 to about 8 times larger.

In one embodiment, there is disclosed a subsea hot-tapping system, comprising an existing pipeline; an inflatable hot-tap body fitted around the pipeline; and a resin injected between the pipeline and the body. In some embodiments, the system also includes a radial arm cutter, adapted to cut a hole in the existing pipeline. In some embodiments, the radial arm cutter comprises a mill head. In some embodiments, the radial arm cutter comprises an abrasive jet head. In some embodiments, the resin actuates one or more seals of the hot-tap body against the existing pipeline.

In one embodiment, there is disclosed a method of hot-tapping an existing pipeline, comprising locating a desired location on the existing pipeline for a hole; fitting an inflatable hot-tap body around the pipeline; and injecting a resin into the hot-tap body. In some embodiments, the method also includes cutting a hole in the existing pipeline with a radial arm cutter. In some embodiments, the method also includes cutting a hole in the existing pipeline with an abrasive water jet. In some embodiments, the method also includes further comprising actuating seals on the hot-tap body against the pipeline with the injected resin. In some embodiments, one or more steps of the method are performed with a remotely operated vehicle.

In one aspect, embodiments disclosed herein relate to a hot tapping system. In another aspect, embodiments disclosed herein relate to deepwater high-pressure hot tapping system. In another aspect, embodiments disclosed herein relate to a deepwater hot tapping system to tap into a well flowline that is currently in place. A parent flowline that transfers oil and/or gas from a number of subsea wells may be installed before the location of the wells is determined. In this aspect, a hot tap system, in accordance with embodiments disclosed herein, may be provided to tap a hole into the existing parent flowline. In another aspect, a hot tap system, formed in accordance with embodiments disclosed herein, may be provided for use in diverless subsea tapping operations.

As used herein, "hot tapping" refers to tapping a pipeline under pressure. Further, as used herein, "ROV" refers to a remotely operated vehicle. Furthermore, as used herein, a parent flowline may refer to a pipe or line through which oil and/or gas may be transferred therethrough and in which holes may be tapped to provide locations for branch pipes to be connected to the flowline. A parent flowline may also be referred to herein as a "carrier pipe", "carrier flowline", "parent pipe", "trunk line", "flowline," or simply "pipeline." Further, as used herein, "coupon" refers to a portion of a pipeline that is to be cut and removed from the pipeline or a portion of the pipeline that has be cut and removed from the pipeline.

In one embodiment, a hot tap system is disclosed herein to tie back subsea wells, whose locations have yet to be determined, to a parent or existing flowline. Uncertainty of reservoir conditions makes pre-locating tie-in points prior to laying the parent flowline difficult. Typically, appropriate well locations may be determined after the flowline is laid and initial wells have been tested. Accordingly, in one embodiment, the parent flowline may have no pre-installed tap locations. Once a location for a well is determined, the parent flowline may be prepared for hot tapping and a hot tap may be assembled at the determined location. In one embodiment, a hot tap system is disclosed that provides a minimum weight hot tap within the limits of ASME Pressure Vessel Code—Div. III. Further, in some embodiments disclosed herein, a hot tap is capable of connecting to flowlines with pressures of approximately 10,000 psi and in approximately 10,000 fsw (feet of seawater).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

That which is claimed is:

1. A subsea hot-tapping system, comprising:
   an existing pipeline;
   a joining pipeline;
   a hot-tap body fitted around the existing pipeline;
   a fluid injected between the existing pipeline and the body, wherein the fluid comprises a resin or a hydraulic fluid; and
   a radial arm cutter, adapted to cut a hole in the existing pipeline.

2. The system of claim 1, wherein the radial arm cutter comprises a mill head or an abrasive jet head.

3. The system of claim 1, further comprising a cleaning apparatus adapted to remove buildup, coatings, and/or insulation from the existing pipeline.

4. The system of claim 1, wherein the fluid actuates one or more seals of the hot-tap body against the existing pipeline.

5. The system of claim 4, wherein the fluid comprises a resin.

6. The system of claim 4, wherein the fluid comprises a hydraulic fluid.

7. A method of hot-tapping an existing pipeline, comprising:
   locating a desired location on the existing pipeline for a hole;
   fitting a hot-tap body around the pipeline;
   injecting a fluid into the hot-tap body, wherein the fluid comprises a resin or a hydraulic fluid; and
   cutting a hole in the existing pipeline with a radial arm cutter or an abrasive water jet.

8. The method of claim 7, wherein cutting a hole in the existing pipeline with a radial arm cutter or an abrasive water jet comprises cutting a hole in the existing pipeline with a radial arm cutter.

9. The method of claim 7, wherein cutting a hole in the existing pipeline with a radial arm cutter or an abrasive water jet comprises cutting a hole in the existing pipeline with an abrasive water jet.

10. The method of claim 7, further comprising actuating seals on the hot-tap body against the pipeline with the injected fluid.

11. The method of claim 7, wherein one or more steps of the method are performed with a remotely operated vehicle.

12. The method of claim 7, wherein the injected fluid comprises a resin.

13. The method of claim 10, wherein the injected fluid comprises a hydraulic fluid.

14. The method of claim 7, further comprising cleaning the existing pipeline prior to fitting the hot-tap body around the pipeline.

15. A subsea hot-tapping system, comprising:
    an existing pipeline;
    a joining pipeline;
    a hot-tap body fitted around the existing pipeline; and
    a radial arm cutter, adapted to cut a hole in the existing pipeline.

16. The system of claim 15, wherein the radial arm cutter comprises a mill head.

17. The system of claim 15, wherein the radial arm cutter comprises an abrasive jet head.

18. The system of claim 17, wherein the abrasive jet head is adapted to be used without an abrasive in order to remove coatings and/or insulation from the existing pipeline.

* * * * *